Inventor
Clarence M. Hamshaw
Attorney
Frank Warren

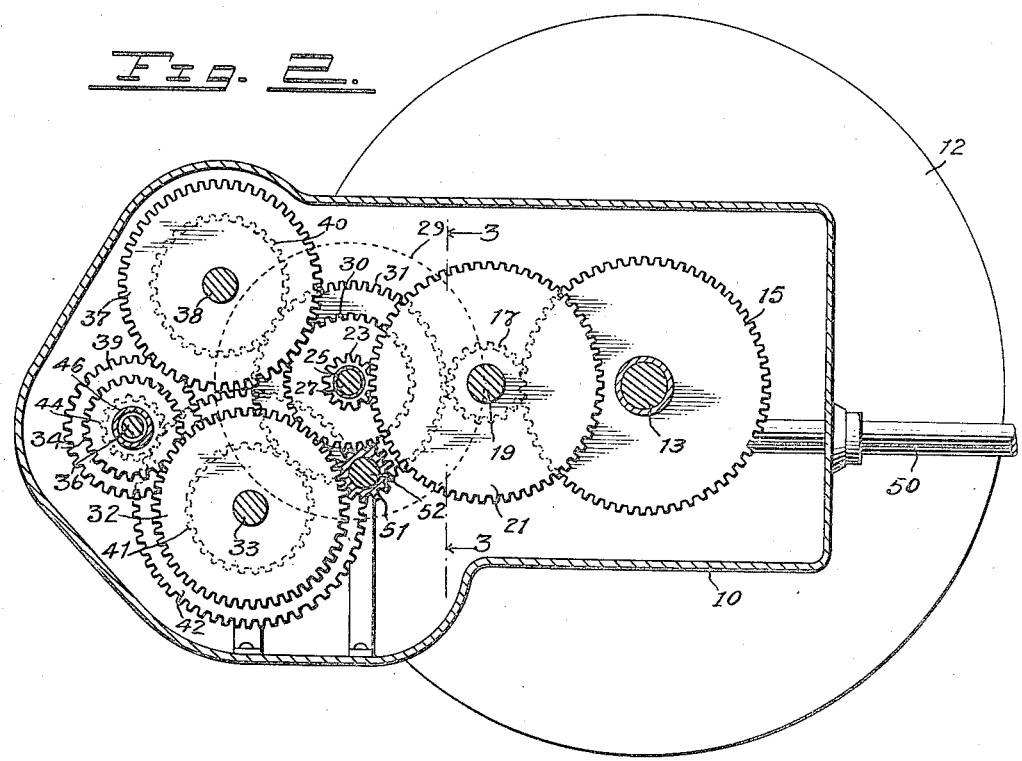//
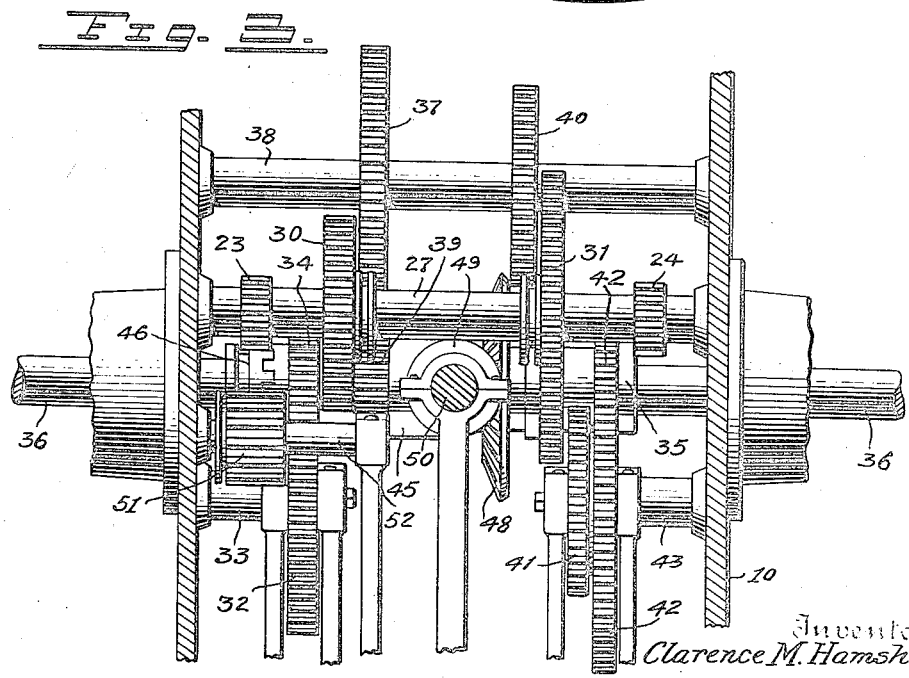

Patented Feb. 5, 1924.

1,482,608

UNITED STATES PATENT OFFICE.

CLARENCE M. HAMSHAW, OF SANTA CLARA, CALIFORNIA.

TRANSMISSION MECHANISM.

Application filed September 20, 1920, Serial No. 411,515. Renewed June 25, 1923.

*To all whom it may concern:*

Be it known that I, CLARENCE M. HAMSHAW, a citizen of the United States residing at Santa Clara, in the county of Santa Clara and State of California, have invented a certain new and useful Improvement in Transmission Mechanism, of which the following is a specification.

My invention relates to improvements in transmission mechanism and more particularly to improvements in transmission mechanism which is adapted for use in rotary tractor plows and the object of my invention is to provide a transmission mechanism of the four-speed selective sliding change speed gear type, together with the reversing mechanism by means of which the dual operation of driving the vehicle over the ground and of driving the soil cutting mechanism is simultaneously performed.

Another object is to provide a transmission mechanism whereby the soil cutting mechanism may be disconnected from the vehicular mechanism when the plow is transferred to different fields in operation.

A further object is to provide a transmission mechanism wherein the vehicle driving wheel of either side of the plow may be disconnected from said mechanism and serve as a pivot when turning corners during the operation of plowing a field.

A still further object is to provide a transmission mechanism which is substantial and durable, simple and efficient, close fitting and direct acting, and comparatively inexpensive in construction.

With the above and other objects in view which will appear as the description proceeds the invention consists of the novel construction, adaptation, arrangement and combination of parts hereinafter described and claimed.

I accomplish these objects by devices illustrated in the accompanying drawings, wherein—

Fig. 2 is a view in longitudinal vertical section taken substantially on a broken line 2, 2 of Fig. 1 showing the disposition of the different gears.

Fig. 3 is a view in transverse vertical section taken substantially on a broken line 3, 3 of Fig. 2.

Figure 1:
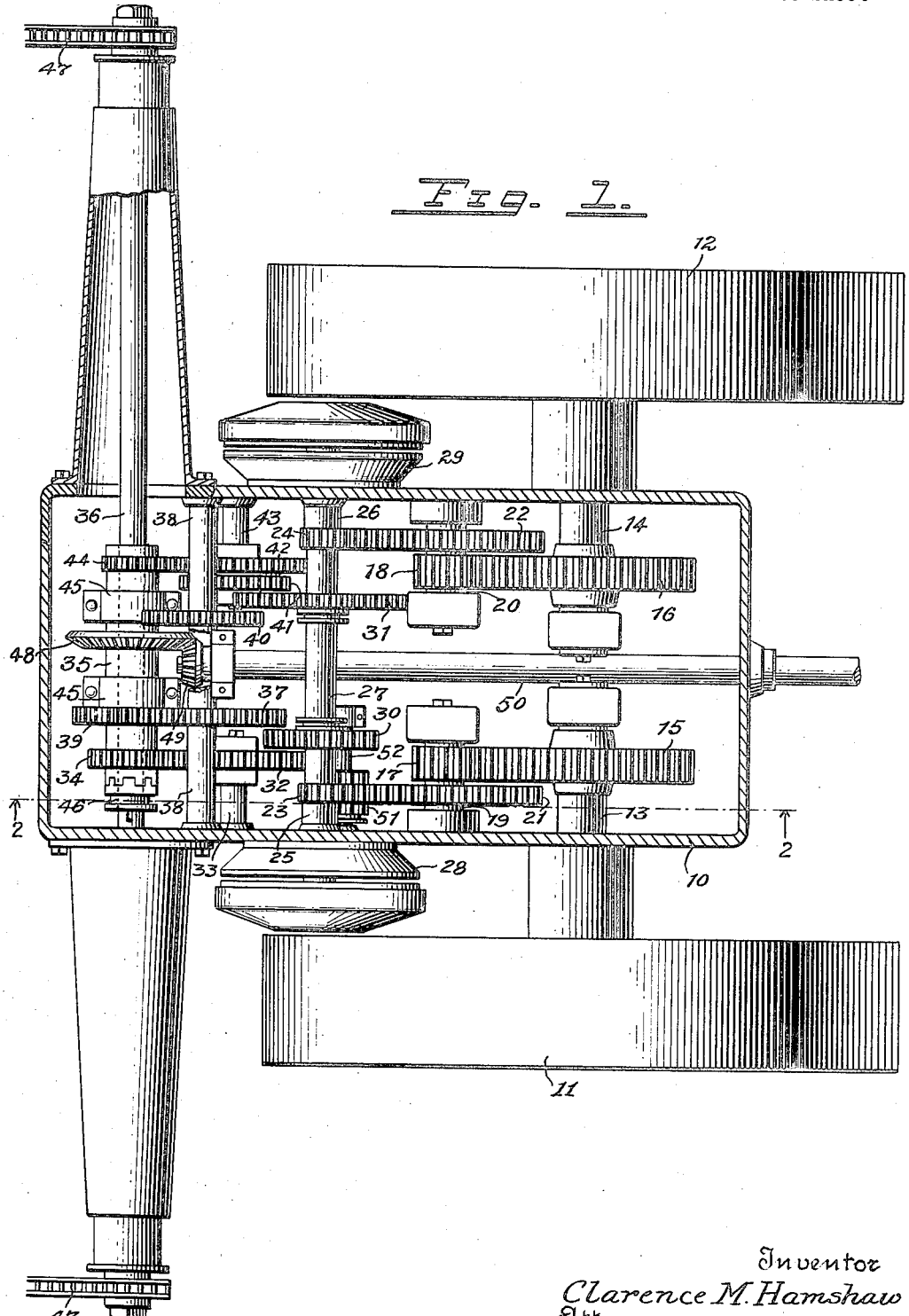
Figure 1 is a top plan view of a transmission mechanism, embodying the objects of my invention, with the casing and other parts in horizontal section.

Referring to the drawings throughout which like reference numerals designate like parts, the numeral 10 designates a casing within which the transmission mechanism is mounted. The numerals 11 and 12 designate vehicular wheels mounted on driven shafts 13 and 14 keyed to which are gear wheels 15 and 16 permanently meshing with pinions 17 and 18 keyed to auxiliary stub shafts 19 and 20. Keyed respectively to said stub shafts are gear wheels 21 and 22 permanently meshing with pinions 23 and 24 which are integral with sleeves 25 and 26 rotatively mounted on a revolvable clutch shaft 27. Mounted on the outer ends of said clutch shaft are clutches 28 and 29 adapted to disengage said sleeves 25 and 26 from operative engagement with said clutch shaft 27. Slidably mounted on said shaft 27 are shifter gears 30 and 31. Said shifter gear 30 is adapted to be brought in mesh with a gear 32 revolvably mounted on a main stub shaft 33 and permanently meshing with a pinion 34 fixed to a sleeve 35 which is revolvably mounted on a shaft 36, and is also adapted to be brought in mesh with a gear 37 keyed to a driven shaft 38 and meshing with a pinion 39 which is likewise fixed to the sleeve 35. Said shifter gear 31 is adapted to be brought in mesh with a gear 40 keyed to the driven shaft 38, and also with a gear 41 which is integral with a gear 42 revolvably mounted on a main stub shaft 43 and permanently meshing with a pinion 44 fixed to the sleeve 35. Said sleeve 35 is secured against thrust movement by bearings 45 and is rotatively engaged with the shaft 36 by means of a clutch 46 slidably mounted on said shaft. Sprocket chains 47 are actuated by sprocket wheels mounted on the outer ends of the shaft 36 by means of which the soil cutting mechanism (not shown) is operated. The sleeve 35 is rotated by a bevel gear 48 fixed thereto and in mesh with a bevel pinion 49 fixed to a driving shaft 50. Reverse speed is obtained by an idler pinion 51 slidably mounted on an idler stub shaft 52 which by virtue of its width is adapted to be brought in mesh with the gears 30 and 32 when same are in neutral position.

In the drawings the transmission mechanism is shown in its neutral position. Low speed forward is obtained by shifting the gear 31 into mesh with the gear 41 when rotary motion will be communicated to the wheels 11 an 12 through the permanently meshed gears substantially as shown. Second speed forward is likewise communicated to said wheels by shifting the gear 31 into mesh with the gear 40. Third speed is obtained by bringing the gear 30 in mesh with the gear 32, and high speed is obtained by shifting said gear 30 in mesh with the gear 37.

It will be obvious that when the clutch 46 is disengaged from the sleeve 35 the same will turn freely on the shaft 36 actuating the vehicular mechanism while the soil cutting mechanism will be at rest when driving the plow to the field of operation.

During the operation of plowing a field either of the wheels 11 or 12 may be independently brought to a standstill and serve as a pivotal point when turning corners by operating the clutches 28 or 29 which will allow the shaft 27 to revolve freely within the pinions 23 or 24 and their integral sleeves 25 or 26.

From the foregoing description taken in connection with the accompanying drawings, the advantages of the construction and of the method of operation of my transmission mechanism will be readily apparent to those skilled in the art to which the invention relates, but while I have described the principle of operation of the invention, together with the device which I now consider to be the best embodiment thereof, I desire to have it understood that the device shown is merely illustrative and that such changes may be made when desired as are within the scope of the invention.

What I claim is:—

1. A transmission mechanism comprising a casing, driven shafts rotatably mounted in said casing; a plurality of change speed gears operatively disposed within said casing adapted to actuate said driven shafts; clutch mechanism interposed between said gears and said driven shafts adapted to independently disengage each of said driven shafts from operative engagement with said system of change speed gears; a jack shaft rotatably mounted in said casing; a hollow sleeve shaft mounted for independent rotation on said jack shaft; means to operatively connect and disconnect said sleeve shaft with and from said jack shaft; means on said hollow sleeve shaft adapted to cooperate with and drive said system of change speed gears; and propelling means for said hollow sleeve shaft.

2. A transmission mechanism comprising a casing; two independent driven shafts rotatably mounted in axial alignment within said casing; a system of change speed gears operatively disposed within said casing adapted to actuate said driven shafts; a train of reduction gears interposed between said system of change speed gears and each of said driven shafts; clutch mechanism interposed between said system of change speed gears and each of said trains of reduction gears adapted to independently disengage each of said driven shafts from operative engagement with said system of change speed gears; a jack shaft rotatably mounted in said casing; a hollow sleeve shaft mounted for independent rotation on said jack shaft; means to selectively engage and disengage said hollow sleeve shaft with and from said jack shaft; gears on said hollow sleeve shaft adapted to mesh with and actuate said system of change speed gears; and propelling means for said hollow sleeve shaft.

In witness whereof, I hereunto subscribe my name this 11th day of September A. D. 1920.

CLARENCE M. HAMSHAW.